United States Patent

Kordulla

[11] Patent Number: 5,262,630
[45] Date of Patent: Nov. 16, 1993

[54] SEEKER, PARTICULARLY FOR TARGET SEEKING MISSILES

[75] Inventor: Hans Kordulla, Owingen, Fed. Rep. of Germany

[73] Assignee: Bodenseewerk Geratetechnik GmbH, Bodensee, Fed. Rep. of Germany

[21] Appl. No.: 963,205

[22] Filed: Oct. 19, 1992

[30] Foreign Application Priority Data

Oct. 25, 1991 [DE] Fed. Rep. of Germany ........ 4135260

[51] Int. Cl.$^5$ ................................................ G01J 1/20
[52] U.S. Cl. ................... 250/203.6; 244/3.16
[58] Field of Search ............ 250/203.1, 203.3, 203.6, 250/235, 236, 334; 244/3.16

[56] References Cited

U.S. PATENT DOCUMENTS 4,085,910 4/1978 Baker et al. .
5,091,637 2/1992 Edwards .......................... 250/203.6

FOREIGN PATENT DOCUMENTS

0099769A1 2/1984 European Pat. Off. .
2454480 12/1975 Fed. Rep. of Germany .
2637735 2/1978 Fed. Rep. of Germany .
2485787 12/1981 France .

*Primary Examiner*—David C. Nelms
*Attorney, Agent, or Firm*—Lowe, Price, LeBlanc & Becker

[57] ABSTRACT

A seeker, particularly for target seeking missiles, includes an imaging optical system which is universally movably supported with respect to a structure using a gimbal mount via an inner gimbal and an outer gimbal, and further includes a detector at which an image of the field of view can be produced by the optical system. In such seeker, the imaging optical system comprises optical members which are disposed at the inner gimbal on the side of the object and which define an optical axis of the imaging optical system. The optical system contains a deflecting mirror for folding a path of rays such that the deflected optical axis coincides with a gimbal axis of the inner gimbal. Image rotating reflecting means is arranged on the gimbal axis of the inner gimbal and reverses the deflected path of rays in order to direct the reversed, deflected path of rays to a detector which is retained at the outer gimbal, placed on the gimbal axis of the inner gimbal and designed as a detector array. The reflecting means is attached to the outer gimbal and driven for rotation about the gimbal axis of the inner gimbal.

14 Claims, 1 Drawing Sheet

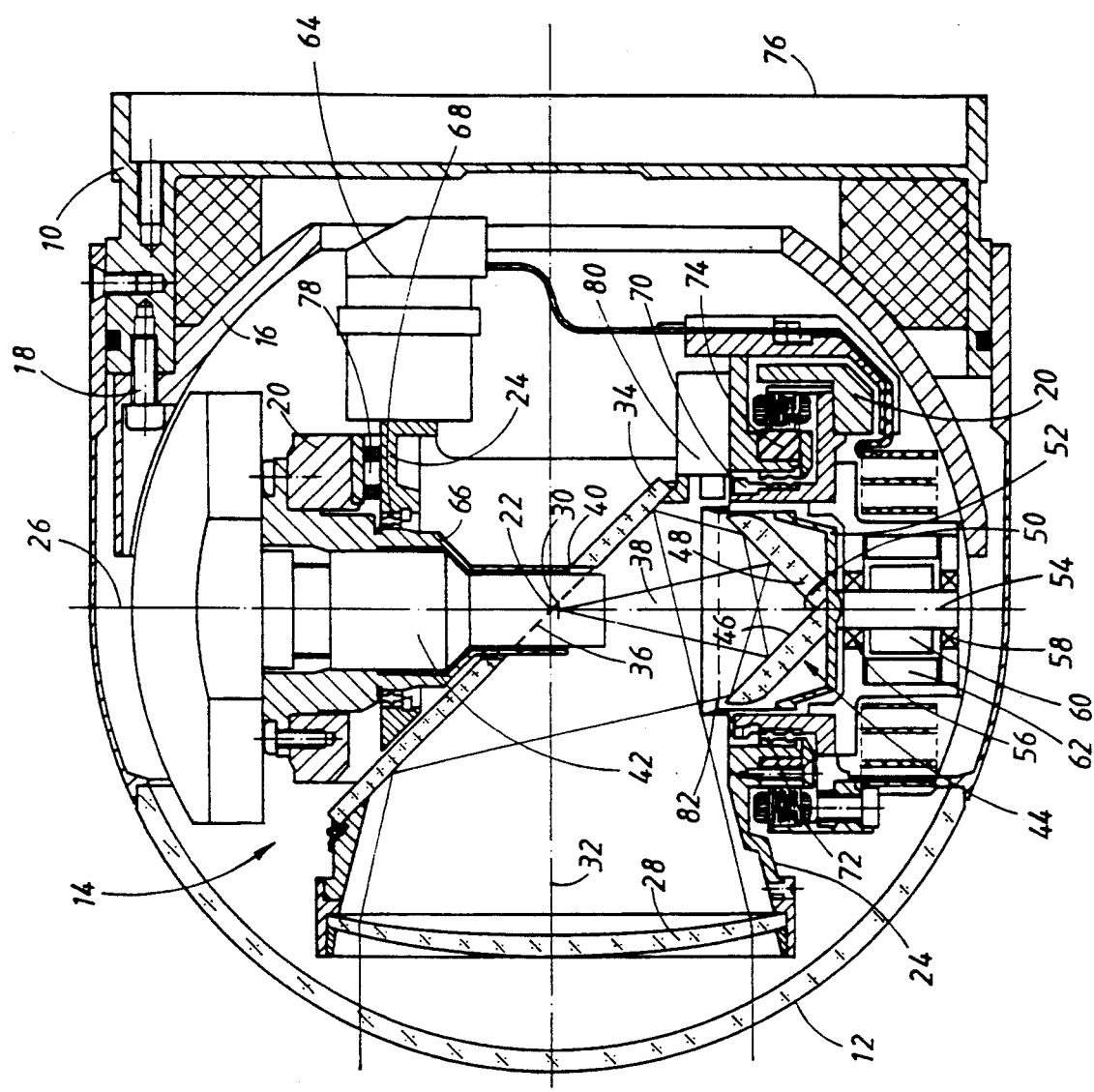

SEEKER, PARTICULARLY FOR TARGET SEEKING MISSILES

BACKGROUND OF THE INVENTION

The present invention relates to a new and improved construction of a seeker, particularly for target seeking missiles.

In its more specific aspects, the invention relates to a new and improved construction of a seeker, particularly for target seeking missiles, including an imaging optical system which is universally movably supported with respect to a structure by means of a gimbal mount via an inner gimbal and an outer gimbal, and a detector at which an image of the field of view can be produced by means of the optical system. In such seeker, (a) the imaging optical system comprises an optical member which is arranged at the inner gimbal on the side of the object and which defines an optical axis of the imaging optical system, (b) the imaging optical system includes a deflecting mirror which is disposed at the inner gimbal and which folds a path of rays defined by the imaging optical system, and (c) reflecting means are provided and reverse the path of rays.

In a known seeker, an infrared receiving system conjointly with a rotational speed sensor and the associated controlling and amplifying electronics are rigidly interconnected in a housing. The infrared receiving system therein comprises a gas-cooled multi-element detector, an imaging optical system in the form of a folded lens system and a scanning device for scanning a field of view covered by the seeker. The imaging optical system images the field of view in a plane defined by the detector. The scanning device causes the image of the field of view to be moved relative to the detector such that the multi-element detector scans the field of view.

The aforementioned housing defines a rotatable gimbal of a gimbal system and such rotatable gimbal is rotatable about the pitch axis and the yaw axis. The seeker, therefore, can be rotated relative to a structure like, for example, the airframe of the missile, through a limited angular range and thereby is aimed at a target. During such rotation through the limited angular range, the electrical conductors of the multi-element detector as well as the high-pressure gas infeed conduits must be flexibly guided across the two gimbal axes, namely the pitch axis and the yaw axis. Such arrangement is constructionally and spatially expensive. The seeker head becomes undesirably large in size and heavy in weight. Furthermore, there result unduly high gimbal moments of inertia.

There are further known seekers in which the imaging optical system is arranged at a gimbal which is supported for movement about two axes whereas the infrared detector is structurally fixedly mounted. The focused beams of infrared rays are passed through the gimbal axes using additional optical elements, namely lens systems and mirrors, and intermediate images. An infrared image is thus produced in the structurally fixed plane of the infrared detector. This requires a very complicated and expensive imaging optical system. Moreover, transmission losses and scattering losses will additionally occur at the optical elements in such construction particularly in the infrared region. Furthermore, losses are incurred in image resolution.

In a seeker such as described, for example, in German Published Patent No. 2,454,480, published on Dec. 11, 1975, an outer gimbal is arranged for rotation about the lengthwise axis of the missile. An inner gimbal can be rotated relative to the outer gimbal about an axis which extends perpendicular to the gimbal axis of the outer gimbal. The inner gimbal supports a lens system which defines an optical axis, and further supports a deflecting mirror and an image rotating ridge mirror. In this construction, the path of rays extends from the lens system to the ridge mirror and therefrom to the deflecting mirror. The deflecting mirror can be swivelled about the gimbal axis of the inner gimbal by means of a gearing. The swivelling movement is effected through half of the rotational angle of the inner gimbal. In this manner, the path of rays is constantly directed into an optical system which is fixed with respect to the outer gimbal and which guides the light beam to a detector.

A further seeker such as known, for example, from German Published Patent No. 2,637,735, published on Apr. 5, 1979, includes scanning means for scanning a field of view by means of a detector using a rotating facetted mirror. The seeker head comprises an outer gimbal and an inner gimbal. A stabilizing gyro rotor is supported at the inner gimbal and carries an annular facetted mirror. A lens system is seated at the inner gimbal and defines an optical axis. A deflecting mirror disposed at the inner gimbal deflects the path of rays laterally obliquely to the facetted mirror from which the imaging light beam is directed to the detector, which is fixed with respect to the inner gimbal, via further optical members.

SUMMARY OF THE INVENTION

Therefore, with the foregoing in mind it is a primary object of the present invention to provide a new and improved construction of a seeker of the initially mentioned type and which seeker is not afflicted with the drawbacks and limitations of the prior art constructions.

Another and more specific object of the present invention is directed to the provision of a new and improved construction of a seeker which is of a comparatively small and lightweight design.

An important object of the present invention is directed to providing a seeker of the initially mentioned type and which seeker is devoid of the light losses and image resolution losses which occur in the prior art seeker constructions.

Now in order to implement these and still further objects of the invention, which will become more readily apparent as the description proceeds, the seeker of the present development is manifested by the features that, among other things, the deflecting mirror is fixedly arranged at the inner gimbal and on the object side of the reflecting means such that the deflected optical axis coincides with the gimbal axis of the inner gimbal, the detector is retained in the outer gimbal on the gimbal axis of the inner gimbal, and the reflecting means is also arranged on the gimbal axis of the inner gimbal and reverses the deflected path of rays which is deflected by the deflecting mirror in the direction of the gimbal axis of the inner gimbal and towards the detector.

In such arrangement, the optics become very simple. The inner gimbal only supports the imaging optical system and the deflecting mirror. The detector is placed on the outer gimbal. No conductors are required to be passed from the inner gimbal onto the outer gimbal.

The detector may constitute a multi-element detector. In such case, the reflecting means may form a single planar mirror. Advantageously the detector, however, constitutes a detector array. The reflecting means, then, form image rotating means which can be driven about the gimbal axis of the inner gimbal.

The reflecting means is arranged advantageously at the outer gimbal. This facilitates driving the reflecting means as, for example, the image rotating means.

BRIEF DESCRIPTION OF THE DRAWING

The invention will be better understood and objects other than those set forth above, will become apparent when consideration is given to the following detailed description thereof. Such description makes reference to the annexed single drawing wherein a section is shown of an exemplary embodiment of the inventive seeker.

DETAILED DESCRIPTION OF THE PREFERRED EMBODIMENTS

Describing now the drawing, it is to be understood that only enough of the construction of the seeker has been shown as needed for those skilled in the art to readily understand the underlying principles and concepts of the present development, while simplifying the showing of the drawing. Turning attention now to the single Figure of the drawing, there is shown therein a structure, especially the airgimbal of a missile, generally designated 10. The front end thereof is closed by means of a dome 12. A seeker 14 is retained within the airgimbal 10. Screws 18 connect a seeker housing 16 to the airgimbal 10. Within the seeker housing 16, an outer gimbal 20 is supported for pivoting about a pitch axis defined by the missile. The support is not visible in the drawing. The pivot axis extends through the center 22 and perpendicular to the plane of the drawing. An inner gimbal 24 is supported in the outer gimbal 20 about a gimbal axis which is defined by the yaw axis of the missile. The gimbal axis 26 of the inner gimbal 24 extends through the aforementioned center 22 and perpendicular to the yaw axis which defines the gimbal axis of the outer gimbal 20.

A lens 28 is placed at the inner gimbal 24 and images a field of view of the seeker in the plane of a detector 30. The lens 28 is made of a material which is transparent for infrared radiation. The lens 28 defines an optical axis 32. This optical axis 32 extends perpendicular to the gimbal axis 26 of the inner gimbal 24 and through the center 22. Furthermore, a deflecting mirror 34 constituting a planar mirror, is arranged at the inner gimbal 24. The deflecting mirror 34 has an inclination of substantially 45 degrees relative to the optical axis 32 as defined by the lens 28. The reflecting plane of the deflecting mirror 34 also extends through the center 22. A light beam received at the lens 28 is deflected by 90 degrees by the deflecting mirror 34 in a manner such that the thus deflected optical axis 38 coincides with the gimbal axis 26 of the inner gimbal 24.

The deflecting mirror comprises a central gap 40. A detector assembly 42 containing the detector 30 protrudes through the gap 40. The detector assembly 42 includes a Dewar vessel and cooling means for cooling the detector 30, as is well known in the art. In the illustrated example, the detector 30 preferably constitutes a detector array, i.e. a detector comprising a number of separate detector elements. The detector assembly 42 is placed at the outer gimbal 20 which also supports reflecting means or mirror means 44. These reflecting or mirror means 44 are arranged at the gimbal axis 26 of the inner gimbal 24 and face the detector 30. The imaging light beam which is deflected by the deflecting mirror 34, impinges upon the reflecting or mirror means 44 and is returned thereby to the detector 30. In this manner the lens 28 produces, via the deflecting mirror 34 and the reflecting or mirror means 44, an image of the observed field of view in the plane of the detector 30.

In the preferred embodiment, as indicated hereinabove, the detector 30 constitutes a detector array. Therefore, the reflecting or mirror means 44 is inherently constructed to form image rotating means which are driven for rotation and cause the image of the field of view to be continually rotated about the gimbal axis 26 of the inner gimbal 24. The image of the field of view is thus rotated relative to the detector 30 or detector array and, as a result, the image of the field of view is scanned by the detector 30 or detector array in the manner of a clock hand. In order to produce the desired image rotation, the reflecting or mirror means 44 is formed by a ridge mirror containing two mutually perpendicular planar mirrors 46 and 48. The edge 50 defined by the ridge mirror intersects with the gimbal axis 26 of the inner gimbal 24 at a right angle. The planar mirrors 46 and 48 are seated in a mount 52 including a shaft 56 which extends along the gimbal axis 26 of the inner gimbal 24. The shaft 54 is supported in bearings 56 and 58 within the outer gimbal 20. The rotor 60 of a drive motor is placed on the shaft 54 and the stator of the drive motor is arranged at the outer gimbal 20.

A rotational speed sensor 64 constituting a gyro is placed at the inner gimbal 24.

The detector assembly 42 is placed in a sleeve-shaped mount 66 which is provided at the outer gimbal 20. The inner gimbal 24 is supported at this mount 66 by means of a ball bea-ring 68. Furthermore, the outer gimbal 20 defines a collar 70 which is arranged coaxially with the gimbal axis 26 of the inner gimbal 24. The inner gimbal 24 is likewise supported at this collar 70 by means of ball bearings 72. The ball bearings 72 are surrounded by the annularly shaped rotor 74 of a motor for adjusting the inner gimbal 24 wherefore the rotor 70 is seated at the inner gimbal 24. The rotor 74 is surrounded, in turn, by a stator 76 of the adjusting motor and this stator 76 is arranged at the outer gimbal 20. The collar 70 surrounds the reflecting or mirror means 44 and its mount 52.

An angle sensor 78 detects the angular position of the inner gimbal 2 relative to the outer gimbal 20. A corresponding angle sensor, which is not illustrated in the drawing, detects the angular position of the outer gimbal 20 about the pitch axis of the missile relative to the seeker housing 16.

A scanning means or device 80 is placed at the inner gimbal 24 and constructed and arranged for scanning markings which are provided at the rim or rim portion of the mount 52. As a result, the scanning means or device 80 supplies scanning data indicative of the angular position of the image rotating reflecting or mirror means 44 relative to the inner gimbal 24, and this is achieved although the mount 52 is supported at the outer gimbal 20. The image rotating reflecting or mirror means 44 containing the two planar mirrors 46 and 48 cause the image to be rotated at twice the frequency of the revolving frequency of the mount 52. A defined image point can thus be associated with each detector signal on the basis of the number of the detector element of the detector array and the angle data supplied by the scanning means or device 80. There are thus obtained, as a result of the image scan, signals which effect aiming the seeker at a detected target via the gimbal adjusting motor 74,76 and a corresponding second gimbal adjusting motor acting about the pitch axis. This is well known in the art and, therefore, not required to be described in detail.

While there is shown and described a present preferred embodiment of the invention, it is to be distinctly understood that the invention is not limited thereto, but may be otherwise variously embodied and practiced within the scope of the following claims.

Accordingly, What is claimed is:

1. A seeker, particularly for target seeking missiles, comprising:

a supporting structure;

an optical imaging system for imaging a field of view of the seeker;

gimbal means comprising an inner gimbal and an outer gimbal and supported at said structure;

said gimbal means universally movably supporting said optical imaging system relative to said structure;

a detector arranged for receiving an image of said field of view produced by said optical imaging system;

said optical imaging system including an optical member arranged at said inner gimbal of said gimbal means;

said optical member being placed on the object side of said optical imaging system and defining an optical axis of said optical imaging system;

said optical imaging system further including a deflecting mirror arranged at said inner gimbal;

said optical imaging system defining a path of rays;

said deflecting mirror folding said path of rays defined by said optical imaging system;

reflecting means for reversing the path of rays defined by said optical imaging means;

said deflecting mirror being fixedly arranged at said inner gimbal and on the object side of said reflecting means;

said inner gimbal defining a gimbal axis;

said deflecting mirror folding said path of rays and deflecting said optical axis of said optical imaging system to coincide with said gimbal axis of said inner gimbal;

said detector being retained at said outer gimbal of said gimbal means and being positioned on the gimbal axis of said inner gimbal;

said reflecting means being also positioned at the gimbal axis of said inner gimbal; and said reflecting means reversing the path of rays deflected by said deflecting mirror in the direction of said gimbal axis of said inner gimbal, and directing the reversed, deflected path of rays toward said detector.

2. The seeker as defined in claim 1, wherein said reflecting means placed on said gimbal axis of said inner gimbal, are attached to the outer gimbal.

3. The seeker as defined in claim 1, wherein:

said detector constitutes a detector array;

said reflecting means constituting image rotating means; and said image rotating means comprising drive means for rotation about said gimbal axis of said inner gimbal.

4. The seeker as defined in claim 3, wherein:

said deflecting mirror contains a gap located in the region of said gimbal axis of said inner gimbal;

a detector assembly containing said detector array protruding into said gap in said deflecting mirror.

5. The seeker as defined in claim 3, wherein:

said image rotating means comprise a ridge mirror defining a ridge; and said ridge intersecting said gimbal axis of said inner gimbal at a right angle.

6. The seeker as defined in claim 4, further including:

a sleeve-shaped mount for mounting said detector assembly;

said sleee-shaped mount being provided at said outer gimbal of said gimbal means; and a bearing for supporting said inner gimbal of said gimbal means at said sleeve-shaped mount.

7. The seeker as defined in claim 6, wherein:

said outer gimbal of said gimbal means is provided with a collar;

said image rotating means being surrounded by said collar;

a bearing for supporting said inner gimbal at said collar.

8. The seeker as defined in claim 7, further including:

a gimbal adjusting motor for adjusting said inner gimbal of said gimbal means;

said gimbal adjusting motor including an annular rotor;

said annular rotor being placed at said inner gimbal;

said bearing which supports said inner gimbal at said collar, being surrounded by said rotor of said gimbal adjusting motor;

said gimbal adjusting motor including a stator; and said stator being placed at said outer gimbal of said gimbal means and surrounding said rotor of said gimbal adjusting motor.

9. The seeker as defined in claim 3, further including:

a drive motor for rotationally driving said image rotating means;

said drive motor being arranged at said outer gimbal of said gimbal means coaxially with said gimbal axis of said inner gimbal of said gimbal means.

10. The seeker as defined in claim 3, further including:

scanning means arranged at said inner gimbal of said gimbal means;

said scanning means being responsive to the angular position of said image rotating means relative to said inner gimbal of said gimbal means during rotation of said image rotating means about said gimbal axis of said inner gimbal.

11. The seeker as defined in claim 1, further including a rotational speed sensor attached to said inner gimbal of said gimbal means.

12. The seeker as defined in claim 1, further including:

an angle sensor attached to said outer gimbal of said gimbal means; and said angle sensor being responsive to the relative angular positions of the inner gimbal and the outer gimbal of said gimbal means with respect to the gimbal axis of the inner gimbal.

13. The seeker as defined in claim 1, wherein said detector comprises an infrared detector.

14. The seeker as defined in claim 13, wherein said optical imaging system comprises at least one lens made of a material which is transparent for infrared radiation.

* * * * *